US010214872B2

(12) United States Patent
Øllgaard

(10) Patent No.: US 10,214,872 B2
(45) Date of Patent: Feb. 26, 2019

(54) FOUNDATION FOR A WIND TURBINE

(71) Applicant: Vestas Wind Systems A/S, Aarhus N. (DK)

(72) Inventor: Børge Øllgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 68 days.

(21) Appl. No.: 15/303,091

(22) PCT Filed: Apr. 14, 2015

(86) PCT No.: PCT/DK2015/050093
§ 371 (c)(1),
(2) Date: Oct. 10, 2016

(87) PCT Pub. No.: WO2015/158352
PCT Pub. Date: Oct. 22, 2015

(65) Prior Publication Data
US 2017/0044734 A1    Feb. 16, 2017

(30) Foreign Application Priority Data

Apr. 16, 2014    (DK) .................................. 2014 70220

(51) Int. Cl.
*E04H 12/34* (2006.01)
*E02D 27/42* (2006.01)
(Continued)

(52) U.S. Cl.
CPC ........... *E02D 27/425* (2013.01); *E02D 27/12* (2013.01); *F03D 13/22* (2016.05);
(Continued)

(58) Field of Classification Search
CPC ....... E02D 27/42; E04H 12/34; F03D 11/045; F03D 13/22
See application file for complete search history.

(56) References Cited

U.S. PATENT DOCUMENTS 3,412,977 A * 11/1968 Moyer .................... F01D 11/08
415/135
2007/0065234 A1    3/2007 Jakubowski et al.
(Continued)

FOREIGN PATENT DOCUMENTS

DE    102011001919 A1    10/2012
DE    102011085947 A1    5/2013
EP       1849920 A2    10/2007

OTHER PUBLICATIONS

Danish Patent and Trademark Office, Search Report in PA 2014 70220, dated Nov. 26, 2014.
(Continued)

*Primary Examiner* — Tara Mayo-Pinnock
(74) *Attorney, Agent, or Firm* — Wood Herron & Evans LLP

(57) ABSTRACT

The present invention provides a foundation for a wind turbine. To reduce set-up time and to allow complete alignment of the platform which carries the base flange of the tower construction, the invention provides a foundation with a cage structure having an upper stress distribution flange connected by a plurality of tensioned anchor bolts to a lower flange. The flanges are separated by a number of distance elements whereby the shape of the cage structure becomes fixed by the combination between tensioned bolts and distance elements. Since the cage structure has a fixed shape, the upper stress distribution flange can be aligned before the cage structure is embedded in concrete, and it becomes unnecessary to wait for the concrete to harden.

25 Claims, 3 Drawing Sheets

(51) Int. Cl.
*F03D 13/20* (2016.01)
*E02D 27/12* (2006.01)

(52) U.S. Cl.
CPC ............... *E02D 2250/0023* (2013.01); *E02D 2250/0046* (2013.01); *E02D 2300/002* (2013.01); *E02D 2600/20* (2013.01)

(56) References Cited

U.S. PATENT DOCUMENTS

2008/0190058 A1   8/2008  Migliore
2009/0044482 A1   2/2009  Tooman

OTHER PUBLICATIONS

European Patent Office, International Search Report and Written Opinion in PCT Application No. PCT/DK2015/050093, dated Jun. 23, 2015.

\* cited by examiner

FOUNDATION FOR A WIND TURBINE

FIELD OF THE INVENTION

The present invention relates to a foundation for a wind turbine and a method of laying a foundation for a wind turbine.

BACKGROUND OF THE INVENTION

When laying a foundation for a wind turbine, a reinforced concrete element is often cast and subsequently, the turbine tower is positioned on the concrete element and fixed hereto. A simple way of fixing the tower to the concrete element is to anchor substantially vertical anchor rods in the concrete element, and attach these to a flange which is attached to the tower wall.

Due to the heavy weight of the tower construction, the anchor rods and the concrete element will be exposed to a large pressure at points carrying the tower. Even though the foundation is levelled before positioning the turbine tower, the anchor rods are exposed to a large pressure from the tower.

Traditionally, final levelling of the tower construction is carried out while a crane supports the tower. After levelling of the tower construction, an additional casting layer, sometimes referred to as grouting, is added to fill out a gap between the concrete element and the levelled flange. Additionally, the grouting may fix the levelled position. The crane is used to keep the tower construction in place while the additional casting layer hardens.

Due to the increasing size of wind turbines, the size of the supporting crane is also increasing which further increases the associated cost and time consumption.

DESCRIPTION OF THE INVENTION

It is an object of embodiment of the invention to provide an improved foundation for a wind turbine, and an improved method of laying a foundation It is a further object of embodiments of the invention to provide a foundation and a method of laying a foundation which reduce the need for a supporting crane.

It is a further object of embodiments of the invention to provide a foundation and a method of laying a foundation which reduces associated time consumption.

According to a first aspect, the invention provides a foundation for a wind turbine comprising a cage structure. The cage structure comprises upper and lower vertically offset stress distribution flanges connected by a plurality of tensioned anchor bolts and separated by a number of distance elements. Since the stress distribution flanges are separated by distance elements and connected by tensioned anchor bolts, the shape of the cage structure is fixed which herein means that the shape does not change e.g. when the cage structure is embedded in concrete.

The upper stress distribution flange can be used as a platform for carrying the wind turbine, and due to the cage structure with a fixed shape, that upper platform can be levelled completely in the correct level for the wind turbine before the concrete is cast and the cage structure becomes embedded in concrete. Accordingly, all levelling work can be completed more quickly without having to wait for concrete to harden. When the levelling is accomplished, concrete is added and allowed to set, and finally, the wind turbine is erected by use of large cranes and placed on a foundation which is already in level. The crane can be removed quickly, and without having to wait for the concrete to harden.

By anchor bolts is herein meant any kind of rod shaped element, e.g. elements having a threading at opposite ends or rods having a threading along its entire length. The anchor bolts may typically have threaded ends and nuts may be used for tensioning the anchor bolts against the surfaces of the stress distribution rings.

By stress distribution flanges is herein meant an element which distributes the stress from the anchor bolts. An upper surface of the upper stress distribution flange may particularly form a platform where the tower construction of a wind turbine can rest. The upper stress distribution flange may e.g. have a circular shape, e.g. the shape of a solid circular disk or the shape of a ring—i.e. a disk with an open central portion. The upper and lower stress distribution flange may be identical, and may be segmented which herein means that the stress distribution flange is constituted by a number of independent segments. In one embodiment, each segments is joined to adjacent segments to form one component, and in another embodiment, the segments are only joined via the anchor bolts and the upper stress distribution flange.

Particularly, the distance elements could be in the form of tubular elements placed about at least a first set of the anchor bolts and extending between the upper and lower stress distribution flanges. In this way, the distance elements may prevent the anchor bolts to become contaminated with concrete and the distance elements not only provide distance, they also facilitate tensioning of the anchor bolts after casting of the concrete.

It should be understood, that the foundation may comprise an additional reinforcement structure, e.g. in the form of steel rods which are positioned vertically and/horizontally around and/or below the cage structure. These additional rods may be arranged at different levels. Some rods may also be arranged at an angle relative to the vertically and/or horizontally arranged rods.

The wind turbine comprises a tower construction which may comprise traditionally tapered round tower sections mounted on top of each other. Each tower section may be made of a steel plate rolled into shape and assembled by welding of opposite free ends thereby constituting a closed ring. Each section may be formed by a number of plates being assembled to form a tower section. The tower may be also be made without using tower sections, e.g. the tower may be assembled by a number of plates having the height of the final tower.

At the bottom of the tower construction, the tower typically forms a base flange by which the tower is connected to the foundation.

In one embodiment, the anchor bolts are spaced in pairs side-by-side forming two rings about the centre of the concrete element, the inner ring of the anchor rods having a slightly shorter diameter than the outer ring of the anchor rods. In this embodiment, the stress distribution flanges may likewise comprise two sets of though holes spaced about the centre.

Another embodiment comprises four sets of anchor bolts spaced side-by-side forming four rings about the centre of the foundation, the stress distribution flanges may likewise comprise a number of through holes which equals the number of anchor bolts. Alternatively, another number of anchor bolts may be applied allowing for another configuration of the anchor bolts and the stress distribution flange. In a simple embodiment, the anchor bolts may form only one ring.

The anchor bolts may have a surface treatment which allows for tensioning the anchor bolts with substantially no frictional forces affecting the concrete. The surface treatment may be in the form of a coating or a casing. As an example, the anchor bolts may be covered with hollow tubes of e.g. plastic, wrapped in plastic tape or coated with a suitable lubrication allowing the anchor bolts to stretch under tension essentially without interacting with the concrete.

In order to fix the tower wall to the foundation, the anchor bolts may extend through holes in the base flange.

At least a part of the anchor bolts and the distance elements may be embedded in a first concrete element. The cage structure thereby forms reinforcement of the first concrete element.

The fixed shape of the cage structure allows levelling of the upper stress distribution flange before casting of the concrete. It should be understood, that the first concrete element may be the only concrete element of the foundation. The invention may, however, include steps of casting additional concrete elements, e.g. for embedding a lower portion of the tower construction in a body of concrete or for further levelling purposes. The first and further concrete elements may be made of identical concrete or different types of concrete.

The lower stress distribution flange could particularly be completely embedded in the first concrete element.

Levelling may be carried out in two or more steps, e.g. a first levelling step before arranging an additional reinforcement structure, and a subsequent second step of levelling when the additional reinforcement structure is arranged. The second step of levelling may thus be for fine adjustment of the levelling of the cage structure.

The anchor bolts could be tensioned by use of a first nut tensioned against an upper surface of the upper stress distribution flange.

The foundation may further comprise a template fixture arranged vertically above the upper stress distribution flange and having a plurality of holes through which the anchor bolts extend. The template fixture may form a vertical extension of the cage structure and therefore facilitate a more exact levelling of the upper stress distribution flange. The template fixture may comprise tools for measuring alignment, e.g. in the form of water gauges etc.

To provide contact between the upper surface of the stress distribution flange and the lower surface of the template fixture, the aforementioned first nuts which are used for tensioning the anchor bolts, could be received in a depression in the lower surface of the template fixture, and the lower surface of the template fixture may thus be arranged against the upper surface of the upper stress distribution flange. The template fixture may be attached to the cage structure before casting of the concrete and it may thereby facilitate levelling of the cage structure and particularly of the upper stress distribution flange. Once the cage structure is embedded in concrete, or at least once the concrete is hardened, the template fixture can be removed and reused for making a new foundation.

A lower surface of the lower stress distribution flange could be arranged on a plurality of levelling structures each having a height being individually adjustable. In this way the entire cage structure can be levelled for the purpose of levelling the upper stress distribution flange. The levelling structures could be embedded in concrete, e.g. in the first concrete element, or in a separate concrete element moulded before moulding of the first concrete element.

The levelling structure may comprise at least two telescopically arranged carrier rods to enable adjustment of the distance between the lower stress distribution flange and the ground or a clearance layer on which the levelling structure may be arranged. The carrier rods may comprise a locking element in order to lock the carrier rods when adjusted to the required height. A base plate and a top plate or similar structure may also be provided in order to protect the carrier rods.

As mentioned above, the levelling structures may be arranged on a clearance layer of a material selected from a group consisting of concrete, hard core, and similar materials to provide surface which facilitates support of the levelling structure and thus facilitates support of the case structure.

At least one of the levelling structures may be arranged substantially vertically below a distance element. In one embodiment, each levelling structure may be arranged substantially vertically below a corresponding distance element.

In one embodiment, at least one of the levelling structures may be attached to the cage structure, e.g. by use of one or more of the anchor bolts, particularly by anchor bolts which are arranged inside tubular shaped distance structures. In this way, the cage structure becomes carried by levelling structures directly below the distance structures where the rigidity of the cage structure is high. The attachment of the levelling structures to the cage structure facilitates the process of embedding at least a part of the cage structure in concrete with a lower risk of displacing one or more of the levelling structure.

In an alternative embodiment, the levelling structure comprises a plurality of wedges. The levelling structure may comprise two steel wedges positioned on top of each other, so that a direction from a blunt end to a pointed end of one wedge is opposite to that of the other wedge. This allows sliding of the wedges relative to each other until the required height of the levelling structure is achieved. The levelling structure may further comprise a steel base and a steel top being attachable to each other, thereby being able to lock the wedges together when adjusted to the required height.

Due to the increasing size of wind turbines, at least one of the upper and lower stress distribution flanges may comprise a plurality of flange segments to facilitate transportation of the stress distribution flange to the constructions site. The number of segments may be equal or different for the upper and lower stress distribution flanges.

The flange segments may be fixed to each other by a geometrical locking structure, such as a dovetail joint, or by a separate locking member which fits into an opening of corresponding shape in two adjacent flange segments. The corresponding shape of the locking structure in two adjacent segments need not be equal. In an alternative two adjacent flange segments are joined by a butt joint without additional fixing, so that two adjacent flange segments are joined only via the anchor bolts and the upper and lower stress distribution flanges.

It may be an advantage to ensure that each flange segment of a stress distribution flange is in level with the other segments. Particularly, such alignment may be important for the upper stress distribution flange such that the upper surface becomes plane and thereby better suited to carry the base flange of the tower construction. To facilitate alignment of the segments of the stress distribution flanges, the foundation may comprise an alignment structure which can be arranged in simultaneous contact with an upper and a lower surface of two adjacent flange segments and thereby be used for pressing the adjacent flange segments in level with each other. The alignment structure may, in one embodiment, comprise a bolt with a bolt head and a nut, or a bolt with two nuts. The two nuts or the bolt head and a nut may be squeezed against the opposite upper and lower surfaces of the two adjacent flange sections. For this purpose, the adjacent edges of the adjacent flanges may form space for such a bolt.

The foundation according to the invention may further comprise a support structure arranged vertically above the upper stress distribution flange. Particularly, the support structure may be adjustable to enable further levelling of the base flange of the tower construction and thus for providing further improved levelling of the tower construction. The support structure may comprise a plurality of individually adjustable elements arranged on the upper surface of the upper stress distribution flange. The support structure may be fixed to the upper stress distribution flange. The support structure may be combined with the previously described levelling structures.

In a second aspect, the invention provides a method of laying a foundation for a wind turbine, the method comprising the steps of:
 providing an upper and a lower stress distribution flange;
 providing a plurality of anchor bolts and a number of distance elements;
 arranging the upper and a lower stress distribution flange such that the upper stress distribution flange is carried by the lower stress distribution flange via the distance elements;
 tensioning at least a first set of anchor bolts to apply a compressive force between the upper and lower stress distribution flanges to prevent separation of the upper and lower stress distribution flanges and thereby form a cage structure with a fixed shape; and
 embedding at least a part of the anchor bolts and distance elements in concrete.

It should be understood, that a skilled person would readily recognise that any feature described in combination with the first aspect of the invention could also be combined with the second aspect of the invention, and vice versa.

The method according to the second aspect of the invention is very suitable when laying a foundation according to the first aspect of the invention. The remarks set forth above in relation to the foundation are therefore equally applicable in relation to the method.

The upper and a lower stress distribution flanges could be provided with a plurality of holes, and the anchor bolts could be arranged through the holes in the upper and lower stress distribution flanges.

The distance elements could be provided with a tubular shape and a first set of the anchor bolts could be arranged inside a distance element. The first set of the anchor bolts could e.g. constitute 10-30 percent of the total number of anchor bolts.

The method may comprise the step of tensioning at least a part of the anchor bolt of the first set of anchor bolts by tensioning a first nut against an upper surface of the upper stress distribution flange before embedding at least a part of the anchor bolts and distance elements in concrete.

The method may further comprise a levelling step of arranging a lower surface of a template fixture against the upper surface of the upper stress distribution flange, and arranging the anchor bolts through holes in the template fixture, the levelling step being carried out before embedding at least a part of the anchor bolts and distance elements in concrete.

The levelling of the lower and upper stress distribution flanges may be carried out by use of a levelling instrument which operates on the template fixture. Such an instrument may be fixed to or form part of the template fixture.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
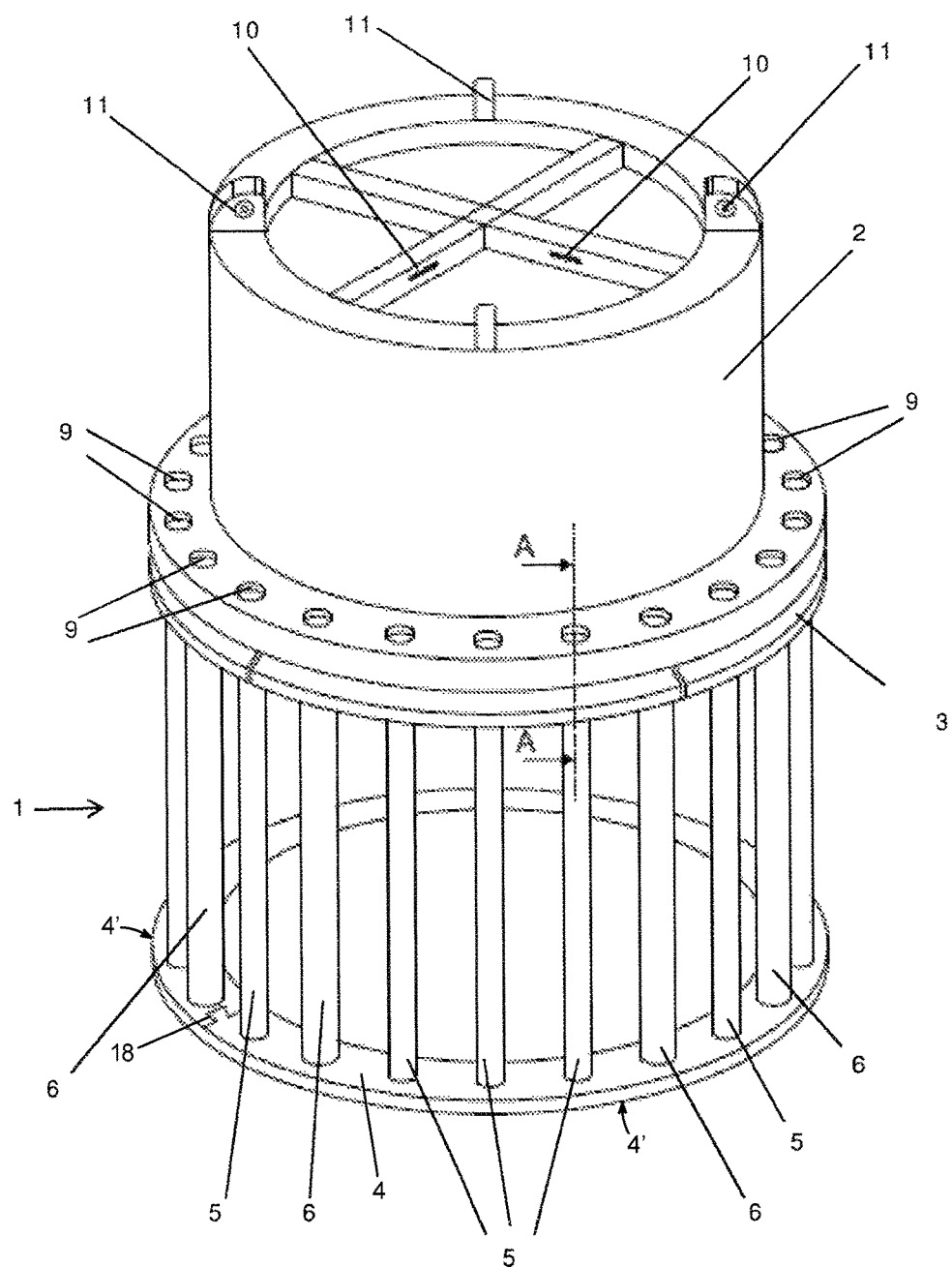
FIG. 1 illustrates an embodiment of a cage structure and a template fixture.

FIG. 1 illustrates a cage structure 1 and a template fixture 2 for a foundation for a wind turbine. The cage structure 1 comprises an upper distribution flange 3 and a lower stress distribution flange 4, the upper and lower stress distribution flanges being vertically offset and connected by a plurality of tensioned anchor bolts 5 and separated by a number of distance elements 6. The shape of the cage structure 1 is fixed by tension of the bolts 5 and compression of the distance elements 6.

The distance elements 6 have a tubular shape and are placed about a first set of the anchor bolts. This first set of anchor bolts are not shown, since the distance element 6 are arranged so that the fully encircle these first set of anchor bolts.

After final levelling of the cage structure, the anchor bolts 5, the distance elements 6, and the lower stress distribution flange 4 will be embedded in a first concrete element (not shown).

Figure 2:
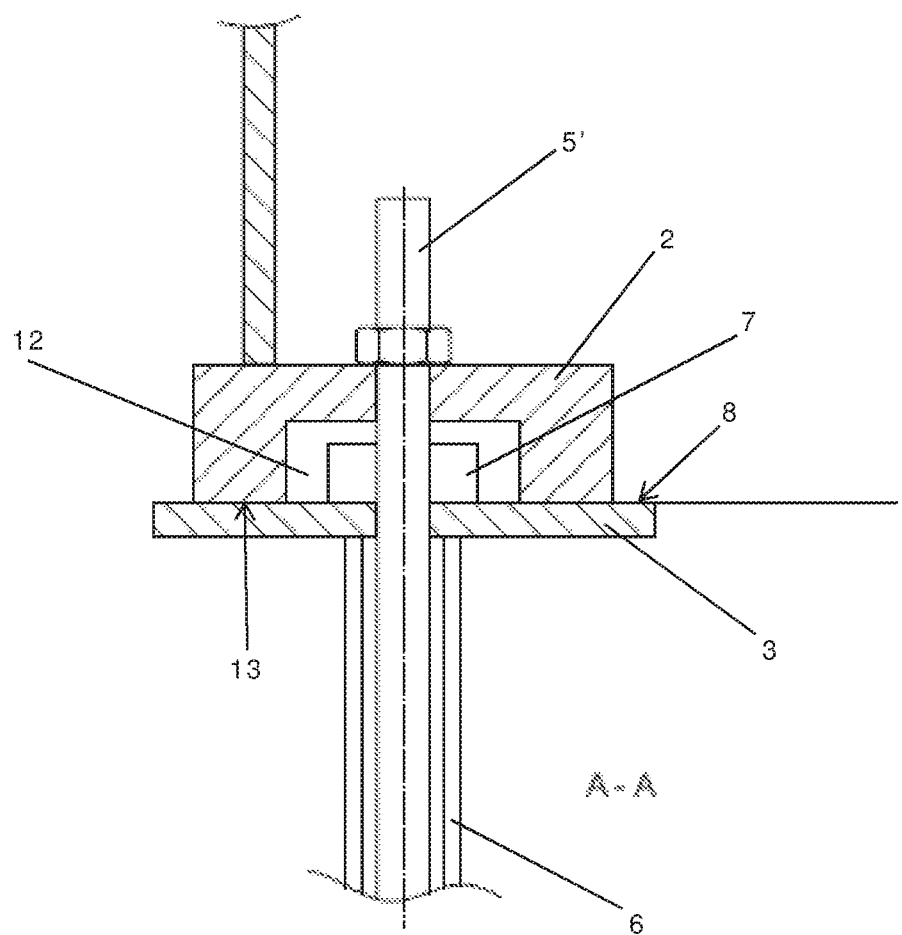
FIG. 2 illustrates section A-A as indicated at FIG. 1.

Some of the anchor bolt 5' of the first set of anchor bolts 5 is tensioned by use of a first nut 7 which is tensioned against an upper surface 8 of the upper stress distribution flange 3, as illustrated in FIG. 2.

The template fixture 2 is arranged vertically above the upper stress distribution flange 3 and has a plurality of holes 9 through which the anchor bolts 5 extend. The template fixture 2 forms a vertical extension of the cage structure 1 and therefore facilitates a more exact levelling of the upper stress distribution flange 3. The template fixture 2 comprises water gauges 10 for measuring alignment.

Additionally, the template fixture 2 comprises four lifting lugs 11 configured to lift the template fixture 2 onto the case structure 1 when the case structure is levelled and ready to receive the template fixture.

The nuts 7 for tensioning of some of the anchor bolts 5 are received in a depression 12 in a lower surface 13 of the template fixture, the lower surface of the template fixture being arranged against the upper surface 8 of the upper stress distribution flange 3.

Figure 3:
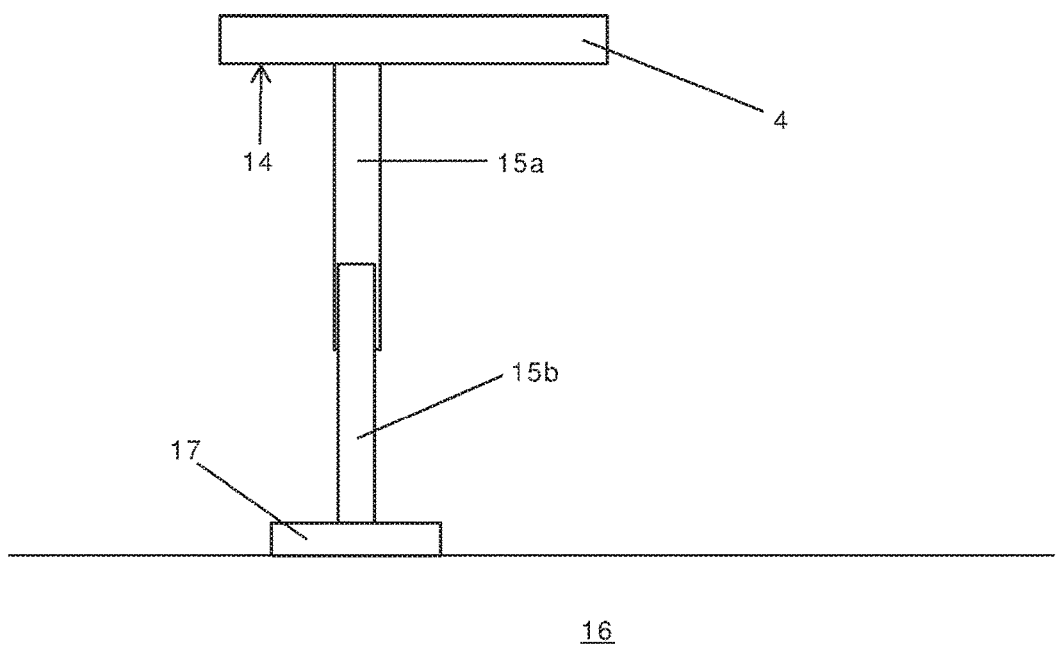
FIG. 3 illustrates an embodiment of a levelling structure.

A lower surface 14 of the lower stress distribution flange 4 is arranged on a plurality of levelling structures 15, as illustrated in FIG. 3, each levelling structure 15 having a height being individually adjustable. In the illustrated embodiment, the levelling structure 15 comprises a pair of telescopically arranged carrier rods 15a, 15b to enable adjustment of the distance between the lower stress distribution flange 4 and a clearance layer 16 on which the levelling structure 15 is arranged. The upper carrier rod 15a comprises a threading arranged on the at least a lower part of the inner surface, whereas the lower carried rod 15b comprises a threading arranged on at least an upper part of the outer surface to enable adjustment of the distance. The levelling structure additionally comprises a base plate 17 on which the lower carrier rod 15b is arranged.

As illustrated in FIG. 1, the upper and lower stress distribution flanges 3, 4 each comprise a plurality of flange segments. The lower flange segments 4' are fixed to each other by a geometrical locking structure 18 in the form of dovetail joints. The corresponding locking structure of the upper flange segments is not shown.

The invention claimed is:

1. A foundation for a wind turbine comprising a cage structure comprising upper and lower vertically offset stress distribution flanges connected by a plurality of tensioned anchor bolts and separated by a number of distance elements wherein the cage structure is configured to be freestanding in a free condition and is configured to be at least partially embedded in concrete in an embedded condition, and where the shape of the cage structure is fixed by tension of the bolts and compression of the distance elements in both the free condition and the embedded condition.

2. The foundation according to claim 1, wherein at least a part of the anchor bolts and the distance elements are embedded in a first concrete element.

3. The foundation according to claim 2, wherein the lower stress distribution flange is embedded in the first concrete element.

4. The foundation according to claim 1, wherein at least a part of one of the anchor bolts is tensioned by use of a first nut tensioned against an upper surface of the upper stress distribution flange.

5. The foundation according to claim 4, wherein the lower surface of the template fixture is arranged against the upper surface of the upper stress distribution flange.

6. The foundation according to claim 1, further comprising a template fixture arranged vertically above the upper stress distribution flange and having a plurality of holes through which the anchor bolts extend.

7. The foundation according to claim 1, wherein a lower surface of the lower stress distribution flange is arranged on a plurality of levelling structures each having a height being individually adjustable.

8. The foundation according to claim 7, wherein the levelling structures are arranged on a clearance layer of a material selected from a group consisting of concrete and hard core.

9. The foundation according to claim 1, wherein at least one of the upper and lower stress distribution flanges comprises a plurality of flange segments.

10. The foundation according to claim 9, wherein the segments are fixed to each other by a geometrical locking structure.

11. The foundation according to claim 1, wherein the tension of the bolts and the compression of the distance elements counteract each other.

12. The foundation according to claim 1, wherein at least one of the plurality of tensioned anchor bolts is tensioned against both the upper and lower stress distribution flanges.

13. The foundation according to claim 1, wherein the fixed shape of the cage structure is the same in both the free condition and the embedded condition.

14. A foundation for a wind turbine comprising a cage structure comprising upper and lower vertically offset stress distribution flanges connected by a plurality of tensioned anchor bolts and separated by a number of distance elements where the shape of the cage structure is fixed by tension of the bolts and compression of the distance elements, where the distance elements have a tubular shape and where the distance elements are placed about at least a first set of the anchor bolts.

15. A foundation for a wind turbine comprising a cage structure comprising upper and lower vertically offset stress distribution flanges connected by a plurality of tensioned anchor bolts and separated by a number of distance elements where the shape of the cage structure is fixed by tension of the bolts and compression of the distance elements, wherein at least a part of one of the anchor bolts is tensioned by use of a first nut tensioned against an upper surface of the upper stress distribution flange, wherein each first nut is received in a depression in a lower surface of the template fixture.

16. A foundation for a wind turbine comprising a cage structure comprising upper and lower vertically offset stress distribution flanges connected by a plurality of tensioned anchor bolts and separated by a number of distance elements where the shape of the cage structure is fixed by tension of the bolts and compression of the distance elements, wherein at least one of the upper and lower stress distribution flanges comprises a plurality of flange segments, wherein at least one of the upper and lower stress distribution flanges comprises an alignment structure arrangeable in simultaneous contact with an upper and a lower surface of a flange segment and an adjacent flange segment to thereby vertically align two adjacent flange segments.

17. A method of laying a foundation for a wind turbine, the method comprising the steps of:
  providing an upper stress distribution flange and a lower stress distribution flange;
  providing a plurality of anchor bolts and a number of distance elements;
  arranging the upper stress distribution flange and the lower stress distribution flange such that the upper stress distribution flange is carried by the lower stress distribution flange via the distance elements;
  tensioning at least a first set of anchor bolts to apply a compressive force between the upper and lower stress distribution flanges to prevent separation of the upper and lower stress distribution flanges and thereby form a cage structure with a fixed shape; and
  embedding at least a part of the anchor bolts and distance elements in concrete.

18. The method according to claim 17, where the upper stress distribution flange and the lower stress distribution flange are provided with a plurality of holes, and where the anchor bolts are arranged through the holes in the upper and lower stress distribution flanges.

19. The method according to claim 17, where the distance elements are provided with a tubular shape and where a first set of the anchor bolts are arranged inside a distance element.

20. The method according to claim 17, comprising a step of tensioning at least a part of one of the first set of anchor bolts by tensioning a first nut against an upper surface of the upper stress distribution flange before embedding at least a part of the anchor bolts and distance elements in concrete.

21. The method according to claim 17, comprising a levelling step of arranging a lower surface of a template fixture against the upper surface of the upper stress distribution flange, and arranging the anchor bolts through holes in the template fixture, the levelling step being carried out before embedding at least a part of the anchor bolts and distance elements in concrete.

22. The method according to claim 17, comprising a step of levelling the lower and upper stress distribution flanges by use of levelling instruments operating on the template fixture.

23. The method according to claim 17, comprising a first levelling step, a subsequent step of arranging an additional reinforcement structure, and a subsequent second levelling step.

24. The method according to claim 17, wherein the compressive force counteracts the tensioning of at least the first set of anchor bolts.

25. The method according to claim 17, wherein tensioning at least a first set of anchor bolts includes tensioning the at least a first set of anchor bolts against both the upper and lower stress distribution flanges.

* * * * *